Feb. 11, 1941.       L. L. RECTOR       2,231,221
PACKING DEVICE
Filed June 1, 1937       3 Sheets-Sheet 1

Inventor
LAURENCE L. RECTOR
By Jack A. Ashley
Attorney

Feb. 11, 1941.  L. L. RECTOR  2,231,221
PACKING DEVICE
Filed June 1, 1937  3 Sheets-Sheet 2

Inventor
LAURENCE L. RECTOR

By Jack A. Ohley
Attorney

Feb. 11, 1941.  L. L. RECTOR  2,231,221
PACKING DEVICE
Filed June 1, 1937  3 Sheets-Sheet 3
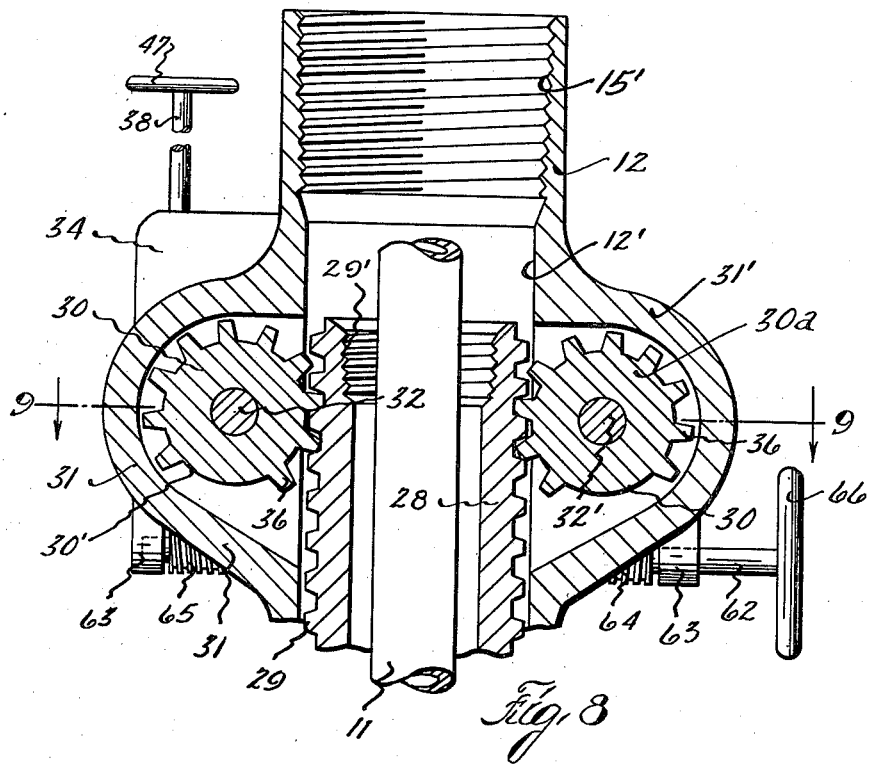
Inventor
LAURENCE L. RECTOR
By Jack A. Ohley
Attorney Patented Feb. 11, 1941

2,231,221

UNITED STATES PATENT OFFICE 2,231,221

PACKING DEVICE

Laurence L. Rector, Fort Worth, Tex.

Application June 1, 1937, Serial No. 145,711

6 Claims. (Cl. 166—15)

This invention relates to new and useful improvements in packing devices.

One object of the invention is to provide an improved packing device for packing off around drill pipe or tubing to retain the well pressure under control, whereby the pipe may be rotated or raised or lowered in the well without danger of a "blow-out."

An important object of the invention is to provide an improved packing device which is arranged to operate within an elongate body mounted on a well casing or other support and which may be quickly and easily moved to and from sealing position without removal from said body.

Another object of the invention is to provide an improved packing device having an elastic packing element for packing off the annular space around a drill pipe or tubing, said element being so constructed that when it is out of sealing position, it may expand to pass couplings, or other protuberances on the drill pipe or tubing, whereby the pipe may be run into and out of the well casing without bodily removing the packing device.

A particular object of the invention is to provide an improved packing device of the character described wherein the packing element is carried by a cylindrical sleeve having a gear rack arranged to be engaged by an exteriorly operated pinion or gear, the rack being constructed so that it will positively engage the gear when the sleeve is lowered into position and also having coarse teeth whereby rapid operation of the device may be accomplished.

Still another object of the invention is to provide an improved packing element which is expansible so as to pass pipe couplings, and improved means for detachably fastening the packing element to the operating member, whereby said element may be easily replaced when in need of repair, or for any other reason.

A construction designed to carry out the invention will be hereinafter described, together with other features of the invention.

Figure 1:
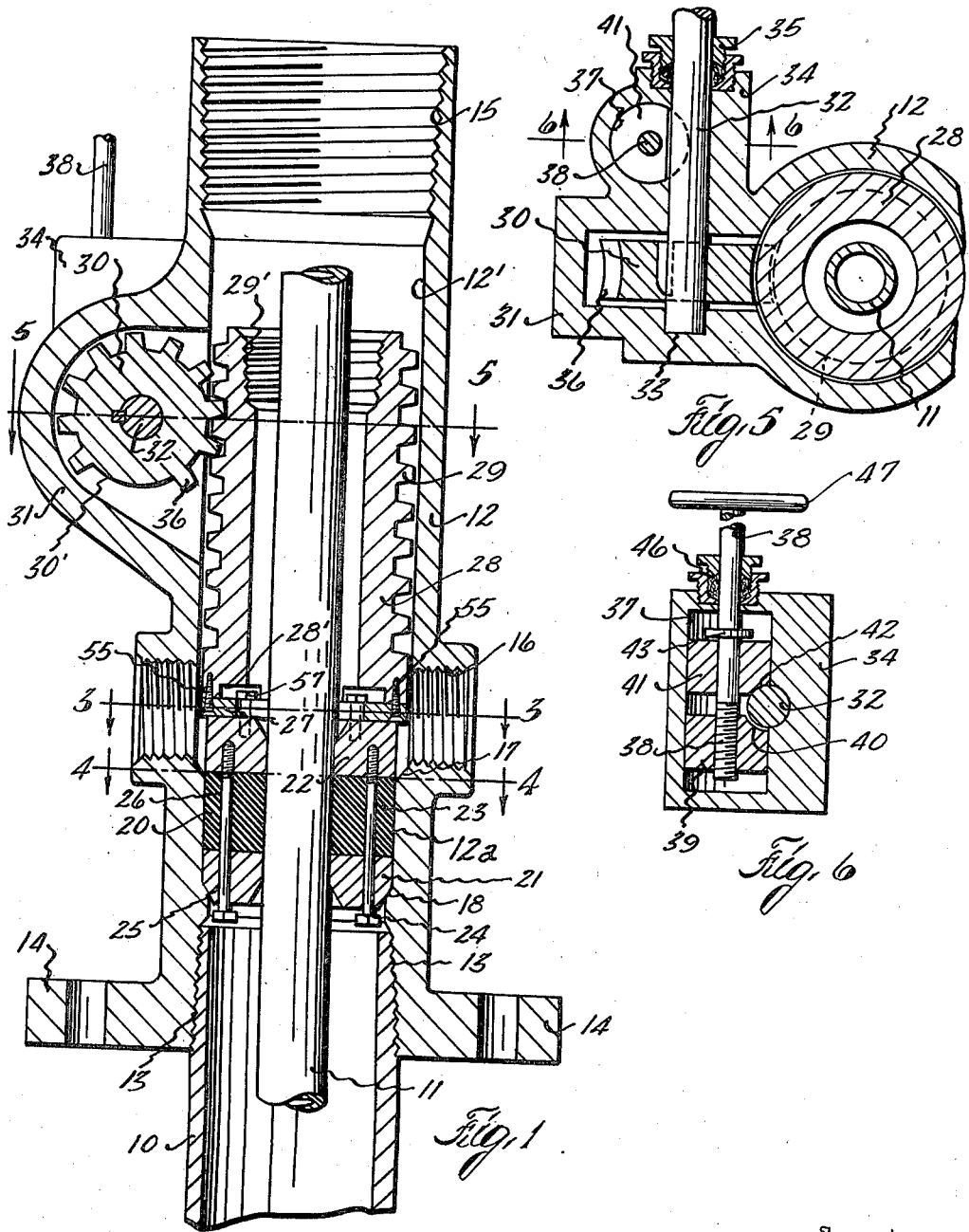
Figure 2:
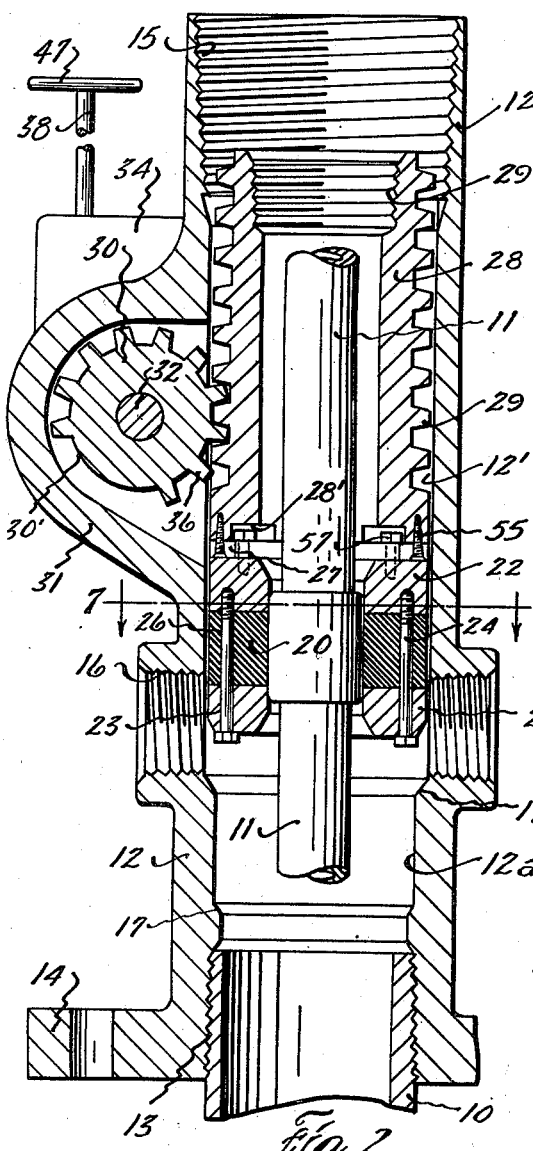
Figure 3:
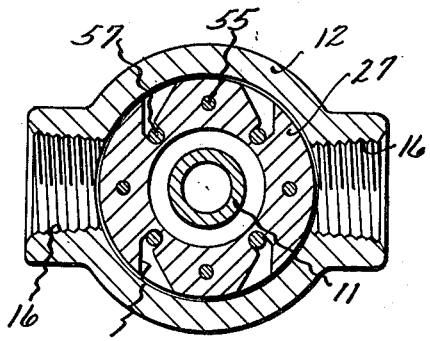
Figure 4:
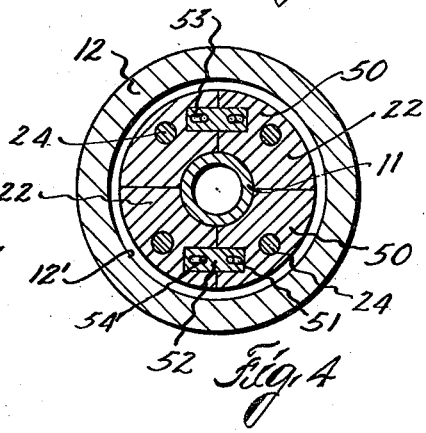
Figure 7:
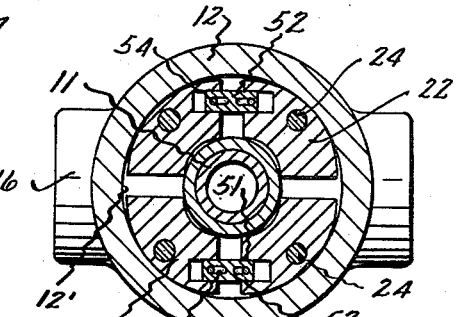

The invention will be more readily understood from a reading of the following specification and by reference to the accompanying drawings, in which an example of the invention is shown, and wherein:

Figure 1 is a transverse vertical sectional view of a packing device, constructed in accordance with the invention, and showing the same in its lowered or sealing position, Figure 2 is a similar view with the device in its raised position, Figure 3 is a horizontal cross-sectional view taken on the line 3—3 of Figure 1, Figure 4 is a horizontal cross-sectional view taken on the line 4—4 of Figure 1, Figure 5 is a horizontal cross-sectional view taken on the line 5—5 of Figure 1, Figure 6 is a transverse, vertical, sectional view, taken on the line 6—6 of Figure 5 and showing the locking means, Figure 7 is a horizontal, cross-sectional view, taken on the line 7—7 of Figure 2 and showing a coupling passing through the packing element, Figure 8 is a transverse, vertical, sectional view, showing the upper portion of a modified form of the invention, and Figure 9 is a horizontal, cross-sectional view, taken on the line 9—9 of Figure 8.

In the drawings, the numeral 10 designates a well casing having the usual well tubing 11 extending axially therethrough. An elongate tubular housing or body 12 has the lower end of its bore internally screw-threaded at 13, whereby said body may be mounted on the well casing or other support. The body is preferably formed with an external annular base flange 14 at its lower end so that the body may be attached to a flanged support which may be mounted on the well casing, in which event the screw-threads 13 at the lower end of the bore of said body would not be used. The upper end of the bore 12' of the housing or body 12 is internally screw-threaded at 15, whereby a pipe, tubing support or other member may be mounted on said body. It would be possible to form an annular connecting flange, similar to the base flange 14 at the upper end of said body. Radial ports 16 which are internally screw-threaded are formed in the body 12 nearer the lower end thereof and these ports are adapted to receive the usual outlet pipes or conductors (not shown), whereby a flow of fluid or liquid from the well casing 10 may enter the lower end of the bore of the body and flow outwardly through the ports 16. The tubing 11 which extends axially through the well casing and through the bore 12' of the body 12 is suspended from a suitable support or head (not shown) which is located at some point in the well connection above the body 12.

The portion of the bore of the body 12 which is disposed between the radial ports 16 and the lower screw-threaded end 13 is reduced as indicated at 12a, whereby an internal annular shoulder 17 is formed within the bore at a point just below the ports 16. An internal annular ground seat or ring 18 which has its upper end beveled is preferably made integral with the body at the lower end of the reduced portion 12a of the bore thereof. An annular packing element 20 surrounds the tubing 11 within the bore of the body 12 and includes a metallic supporting member 21 which has its lower outer edge portion beveled, complementary to the bevel of the ring or seat 18, whereby said metallic member may seat on said above the member 21 and an elastic distortable ring. An upper metallic member 22 is mounted packing ring 23 is confined between the members 21 and 22, as is clearly shown in Figures 1 and 2. Bolts 24 extend through opening 25 in the supporting member 21 and opening 26 in the packing ring 23, and are screw-threaded into the upper member 22. The bolts are slidable through the openings in the supporting member 21 but are closely engaged in the openings in the packing ring 23, whereby fluid under pressure cannot leak therethrough. The packing element 20 is slidable vertically within the bore of the body 12 and when said element is within the upper end of the bore 12' of the body 12, there is a clearance between members 21 and 22 and packing ring 23, and the bore of said body. Therefore, when the packing element is moved out of the reduced portion 12a of the bore, fluid may by-pass between the packing element and the wall of the bore 12'. However, when the supporting member 21 is engaging the annular beveled seat or ring 18, a downward pressure on the upper member 22 will distort the packing ring 23 into sealing engagement with the bore of the body and also with the exterior surface of the tubing, as is clearly shown in Figure 1. Therefore, the element 20 provides a means for sealing off the annular space between the tubing 11 and the bore of the body 12 at a point below the radial ports 16. It is pointed out that although the ports are shown above the seat or ring 18, it is possible to locate the ring about the ports, whereby the packing off will occur at a point above said outlet.

For moving the packing element within the body and exerting a sealing pressure thereon, the upper member 22 of said element is secured to a fastening plate 27, which plate is in turn carried by the lower end of an elongate operating sleeve 28. The sleeve is movable vertically within the bore 12' of the body and is provided with a plurality of annular gear teeth 29 on its outer surface. The diameter of the sleeve 28 is such that there is only a slight clearance between the teeth 29 and the wall of the bore 12'. Since the teeth are annular instead of spiral, it will be obvious that they provide a gear rack which extends substantially throughout the vertical length of the sleeve 28. Manifestly, as the sleeve 28 is moved vertically within the bore of the body 12, the packing element 20 carried at its lower end is moved therewith.

For imparting vertical movement to the sleeve 28 an operating gear or pinion 30 is mounted within an extension 31 which is formed at one side of the housing or body 12 near the upper end thereof, and which is preferably made integral with said body. The gear or pinion 30 is secured by a key, or otherwise on a transverse shaft 32 which has one end journaled in a recess 33 formed in one vertical wall of the extension 31, as is clearly shown in Figure 5. The other end of the shaft extends outwardly from the extension 31 and through a boss 34 which is preferably made integral with the extension 31. A suitable stuffing box 35 surrounds the shaft 32 and is located at the outer end of the boss 34. The stuffing box 35 of course acts to prevent a leakage of pressure around the shaft 32.

The gear or pinion 30 is provided with a plurality of teeth 36 which extend substantially around the entire periphery of said gear. However, there is a portion of the periphery of the gear or a blank space 30' on which no teeth 36 are formed. The teeth 36 are arranged to engage the gear racks on the sleeve 28 and obviously, when the gear 30 is rotated with the teeth thereof meshing with said gear racks, a vertical movement is imparted to the sleeve.

The extended end of the gear shaft 32 may be provided with a hand wheel, crank or other means (not shown) whereby it may be readily rotated so as to rotate the gear and impart movement to the gear racks, and sleeve 28. In order to lock the shaft 32 in various positions so as to lock the gear 30 and sleeve 28 against movement, a chamber 37 is formed in the boss 34 which is located at one side of the extension 31, (Figures 5 and 6). A stem 38 extends vertically and axially of the chamber 37 and has its lower end screw-threaded into a block 39, which block is substantially of the same diameter as the chamber and is slidable vertically therein. The shaft 32 has one half thereof exposed in the bore of the chamber 37 and the block 39 has its inner upper edge recessed at 40, whereby when the block is moved upwardly within the chamber 37, this recess will engage the exposed portion of the shaft 32. A similar block 41 is slidably mounted on the stem and has its inner lower edge recessed at 42 so as to engage the periphery of the shaft 32. A collar or external flange 43 provided on the stem engages the upper end of the block 41 and holds the same in engagement with the shaft 32 as is clearly shown in Figure 6. A stuffing box 46 surrounds the upper end of the stem which extends outwardly of the boss 34 and a suitable hand wheel 47 is mounted on the extreme upper end of the stem.

When the blocks 39 and 41 are in the position shown in Figure 6, it will be obvious that the shaft 32 may be rotated to rotate the gear 30 and thereby impart a vertical movement to the sleeve 28. When it is desired to lock the shaft 32 against rotation, the stem 38 is rotated so that the block 39 is screwed upwardly on said stem, which upward movement causes the recess 40 of said block to engage the shaft 32. When this occurs, the block 39, as well as the block 41, is forced into tight engagement with the shaft 32 and the frictional grip of the block against the periphery of the shaft will prevent a rotation of said shaft. By rotating the stem 38 in an opposite direction, the block 39 may be moved away from the shaft, whereby the frictional grip or engagement is released to permit rotation thereof. Although this particular means has been shown for locking the shaft 32 against rotation, it is pointed out that various methods of accomplishing this purpose may be employed without departing from the invention.

In the normal operation of the packing device and while the well is producing, the packing element 20 is in the position within the upper end of the bore 12' of the body 12, but should an occasion arise requiring packing off of the annular space between the well casing 11 and the bore of the body 12, the packing element may be quickly lowered to its sealing position in engagement with the seat or ring 18. This is done by rotation of the shaft 32 which rotates the gear 30 and thus imparts a vertical downward movement to the sleeve 28 and the packing element 20 carried thereby. When the supporting member 21 of the packing element 20 engages the seat or ring 18, continued rotation of the gear resulting in a continued downward movement of the sleeve 28, distorts or deforms the packing ring 23 into sealing engagement with the wall of the bore 12a and with the exterior surface of the drill pipe or tubing 11, thus sealing off the annular space therebetween. Thus the well pressure is held under control and cannot escape upwardly through this annular space. When the packing element 20 is moved to its sealing position, it is possible to remove the well connections above the body 12 or to make any changes or repairs therein, without danger of a blow-out or loss of well pressure. By connecting the packing device herein described to the upper end of the well casing, it is possible to drill the well with the packing element 20 in readiness at all times to move to its packing position so that there is no danger of the well getting out of control due to excessive pressure.

To move the packing element 20 from its seated position, it is only necessary to rotate the shaft 32 in an opposite direction, whereby the gear 30 is rotated in an opposite direction which imparts an upward movement to the sleeve 28 and the packing element 20.

If it is desired to remove the sleeve and element entirely from within the body, it is only necessary to rotate the gear 30 until the blank portion 30' on its periphery, or that portion which is void of gear teeth 36, is opposite the teeth 29 on the sleeve. When this is done all of the teeth 36 on the gear 30 are located within the extension 31 and it is possible to lower a pipe into the upper end of the body 12 and connect said pipe into an internal threaded box 29' formed at the upper end of the bore of the sleeve 28, whereupon said sleeve and packing element may be entirely removed from the body. The packing element may be repaired or replaced if worn, and the sleeve and element returned to the bore of the body in the same manner.

In many cases, it is desirable that the packing element and sleeve remain in the body 12 while pipe or tubing is being run into the well casing. Since such pipe or tubing has coupling collars or other projections or protuberances throughout its length, which collars have a larger diameter than the pipe or tubing, it is necessary that the packing element 20 be so constructed that it will permit the passage of such collars or couplings. The packing element shown and described herein will permit the passage of couplings or projections on the tubing and this is one of the features of the invention. The construction of the packing element 20 is clearly shown in Figures 3, 4 and 7.

Referring specifically to Figure 4, it will be seen that the upper confining member 22 is constructed in four sections or quadrants 50 and one of the bolts 24 extends into each quadrant. Each pair of quadrants form one half of the member 22 and the quadrants of each pair are provided or formed with recesses 51 in their engaging faces. The recesses register with each other so that a connecting bar 52 may be inserted therein. The bar is formed with vertical slots 53 in each end thereof and a vertical pin 54 passes through this slot and is fastened in each quadrant. Thus the bar 52 forms a link for connecting the quadrants 50 of each pair, whereby said quadrants although connected, may undergo a radial movement with relation to the center of the member 23. In effect, the member 22 is formed of two substantially semi-circular sections, each section being split or divided and connected by the link or bar 52.

The lower member 21 of the packing element 20 is formed in exactly the same manner as is the member 22 and its quadrants are alined vertically with the quadrants of the upper member, whereby the bolts 24 which fasten into the quadrants of the upper member may pass through the quadrants of the lower member 21 in substantially the same position. The packing ring 23 is also formed in four sections or quadrants and one of the sections is confined between one of the quadrants of the member 22 and the alined quadrant of the member 21. Since one of the bolts 24 extends through each of the quadrants of the confining member, it will be evident that said bolt also passes through one of the quadrants of the packing ring. With this arrangement, it will be obvious that when the sections or quadrants of the confining members 21 and 22 are moved radially of the tubing 11, the split or sectional packing ring 23 moves with said members since it is fastened therebetween. The radial expansion of the packing element in this manner, is of course limited by the length of the slot 53 in the connecting links or bars 52 for manifestly, the engagement of the pins 54 with the ends of the slots 53 limit the expansion of the confining members 21 and 22, as well as the expansion of the packing ring 23 carried by these members.

The fastening plate 27 which forms the connection between the operating sleeve 28 and the packing element 20, is secured to the underside of the sleeve by screws 55 (Figures 1 and 3), whereby said plate is rigidly fastened to said sleeve. For detachably securing the upper member 22 to the plate 27, said plate is formed with a plurality of angular slots 56 which extend inwardly from the periphery of the plate. Stud bolts 57 are secured in the top of the upper confining member 22 of the packing element 20 and it is preferable that one of these bolts is provided on each quadrant 50 of said member. The bolts are adapted to be engaged in the slots 56 and move to the innermost portion thereof as shown in Figure 3. When in this position, the head of each bolt 57 is resting on the upper surface of the plate 27 because the inner ends of the slots 56 are only sufficiently large to receive the bolt shank. Therefore, the upper confining member 22 of the packing element 20 is suspended from the plate 27 which plate is in turn secured to the sleeve 28. The sleeve is recessed at 28' so as to receive the bolt heads which project above the top of the plate 27, as is clearly shown in Figure 1. By observing Figure 3, it will be apparent that the bolts 57 may undergo a limited radial movement within the slots 56 and it is this movement which permits the expansion or radial movement of the confining members 21 and 22 and the packing ring 23, as has been above described.

The operation of the device is obvious. The sleeve 28 having the packing element 20 connected to its lower end is lowered within the body 12 and the teeth thereof are engaged with the teeth of the operating gear 30 by rotating the gear 30 so that the space 30' which is void of teeth thereon moves into the extension 31. The gear 30 may be locked so as to hold the sleeve within the enlarged portion 12' of the bore of the body 12 or in the position shown in Figure 2, whereby the packing element 20 is held above the radial ports 16. At this time a flow may occur from the well casing 10 upwardly into the lower end of the body 12 and then outwardly through said ports. Since the upper portion of the bore of the body is larger than the portion 12a below the ports 16, it will be manifest that there will be a clearance between the outer periphery of the packing element and the wall of the bore 12'. Therefore, with the parts held in the position shown in Figure 2 it is possible to run a drill pipe or tubing 11 downwardly through the packing element and sleeve 28 without removing these parts from within the body 12. Since the couplings in the tubing string or drill pipe are larger in diameter than said tubing or pipe, the entrance of the coupling collar into the packing element will cause a radial expansion of the packing element 20 as is clearly shown in Figure 7. The construction of the packing element 20 in sections or quadrants permits this expansion. It is noted that the bore 22' of the upper confining member 22 may be beveled as shown at 22' to guide the collar into the packing element. The lower confining member 21 may also have its bore beveled as shown at 21' to serve to guide the tubing or pipe into the member when the same is being raised.

If it is desired to seal off the annular space between the tubing and the wall of the body 12 while the tubing is being run into the well, it is only necessary to rotate the gear 30 which will immediately move the sleeve and packing element downwardly into the reduced portion 12a of the bore of the body 12. The internal shoulder 17 which is located in the bore just below the ports 16 may be inclined or beveled to aid in guiding the packing element into the reduced portion 12a of the bore. Manifestly as the element enters this reduced portion it is contracted or returned to its normal size, whereby the inner periphery of the packing ring 23 engages the exterior surface of the tubing. After the lower member 21 of the packing element engages the seat 18 continued rotation of the gear 30 will continue the downward movement of the sleeve and apply a pressure to the elastic packing ring 23, whereby said ring is deformed into sealing engagement with the bore 12a of the body and also with the tubing, whereby the annular space around said tubing is positively sealed off. It is noted that when the packing ring 23 is in a sealing position, the upper end or top of the ring is in a plane below the internal shoulder 17, whereby there is no danger of the ring being distorted outwardly toward the radial ports 16 but is confined within the reduced portion 12a of the bore.

By rotating the gear 30 in an opposite direction, the sleeve and packing element 20 may be moved upwardly from the seat 18. This moves the packing element 20 into the enlarged portion 12' of the bore of the body and permits that element to undergo expansion, as has been described in the event that a coupling or other enlargement on the tubing or pipe 11 is passed therethrough. If it is desired to remove the sleeve and packing element from the body, the gear is rotated until the portion 30' which is void of teeth 36 is opposite the teeth 29 of the sleeve. A suitable pipe or other lifting device is then engaged in the upper end of the sleeve and the same is withdrawn from the body. If the packing element becomes worn and needs replacement it is only necessary to slide the bolts 57 out of the slots 56 of the plate 27, whereby the packing element is detached from said plate. The elastic packing ring 23 may then be replaced with a new one and the element again readily mounted on the plate by merely inserting bolts 57 into the slots 56. The sleeve and packing element may then be lowered into the body and the device is ready for further use.

It has been found that in some instances, the single gear or pinion 30 will cause the operating sleeve 28 to bind against the wall of the housing or casing 12 on the side opposite said pinion, whereby the smooth and efficient movement of the sleeve through the bore 12' is retarded. In such cases, it might be desirable to provide a second operating pinion 30a which is located within an extension 31' formed on the housing 12, diametrically opposite the extension 31. The pinion 30a is constructed in exactly the same manner as the pinion or gear 30 and is mounted on a transverse shaft 32' which extends outwardly through a collar or boss 34' which is preferably integral with the extension 31'. It is noted that the shafts 32 and 32' are in the same horizontal plane and engage the teeth of the operating sleeve 28 on opposite sides thereof. A suitable stuffing box 35' surrounds the shaft 32' at the outer end of the collar 34' and a gear 60 is carried by the outer end of the shaft. The construction of the gear or pinion 30, its shaft 32 and the associate parts, is exactly the same as that shown in Figure 5. On the extreme outer end of the shaft 32 a gear 61, similar to the gear 60, is mounted. A horizontal worm shaft 62 is mounted in suitable bearing supports 63 which extend outwardly from the bosses 34 and 34' and from the body 12, as is clearly shown in Figure 9. The worm shaft has a righthand screw 64 which is in constant engagement with the gear 60 mounted on the shaft 32', while a second worm, 65 which is lefthand, is in constant engagement with the gear 61 on the shaft 32. The worm shaft 62 is provided with a suitable hand wheel 66, whereby it may be readily rotated.

Obviously, when the worm shaft 62 is rotated the screw 64 imparts a rotation to the pinion or gear 30a through the medium of the gear 60 and shaft 32', while the screw 65 imparts a rotation in the opposite direction to the gear or pinion 30 through the medium of the gear 61 and shaft 32. Therefore, the gears or pinions 30 and 30a are rotated simultaneously to raise and lower the operating sleeve 28. The provision of the two operating gears in place of just a single gear as in the first form, assures a positive vertical movement of the sleeve 28 axially within the bore 12' of the body 12. Since the gears engage the sleeve on diametrically opposite sides there is no danger of binding the sleeve against one side of the bore and efficient operation is assured.

What I claim and desire to secure by Letters Patent is:

1. A packing device including, a tubular body, a cylindrical pipe extending axially through the body, a cylindrical operating sleeve having an annular gear rack thereon and movable longitudinally within the bore of the body and surrounding the pipe, a rotatable gear adapted to engage the gear rack for imparting vertical movement to the sleeve, the sleeve having a sliding fit in the bore, a cylindrical elastic packing element carried by the sleeve and surrounding the pipe within the bore for packing off the annular space between said pipe and bore, and means within the body for deforming the elastic element into sealing position when the sleeve and element are moved to a predetermined position within the bore.

2. A packing device including, a tubular body, a cylindrical pipe extending axially through the body, a cylindrical operating sleeve having an annular gear rack thereon and movable longitudinally within the bore of the body and surrounding the pipe, a rotatable gear adapted to engage the gear rack for imparting vertical movement to the sleeve, the sleeve having a sliding fit in the bore, a cylindrical elastic packing element carried by the sleeve and surrounding the pipe within the body for packing off the annular space between said pipe and bore, means within the bore for deforming the elastic element into sealing position when the sleeve and element are moved to a predetermined position within the bore, and means for locking the packing element and sleeve in any position within the bore of the body.

3. A packing device including, a tubular body having a cylindrical pipe extending axially therethrough and adapted to be mounted on a support, an operating sleeve having an annular gear rack formed thereon within the bore of the body and surrounding the pipe, a rotatable gear mounted at one side of the body and having its teeth projecting into the bore of the body to engage the gear rack for imparting movement to the sleeve, said gear having a portion of its periphery void of teeth whereby the sleeve may be moved into and out of the bore when said blank portion of the gear is alined with the bore of the body, an elastic packing element carried by the sleeve and surrounding the pipe within the bore for packing off the annular space between said pipe and bore, and means within the bore for deforming the element into sealing position when the sleeve and element are moved to a predetermined position within the bore.

4. A packing device including, a tubular body having a cylindrical pipe extending axially therethrough and adapted to be mounted on a support, an operating sleeve having an annular gear rack formed thereon within the bore of the body and surrounding the pipe, a rotatable gear mounted at one side of the body and having its teeth projecting into the bore of the body to engage the gear rack for imparting movement to the sleeve, said gear having a portion of its periphery void of teeth whereby the sleeve may be moved into and out of the bore when said blank portion of the gear is alined with the bore of the body, an elastic packing element carried by the sleeve and surrounding the pipe within the bore for packing off the annular space between said pipe and bore, and means within the bore for deforming the element into sealing position when the sleeve and element are moved to a predetermined position within the bore, said packing element being constructed in sections whereby it is capable of radial expansion when not in sealing position to permit the pipe and projections thereon to be passed therethrough.

5. A packing device including, a tubular body, a cylindrical pipe extending axially through the body, an operating sleeve having an annular gear rack thereon and movable longitudinally within the bore of the body and surrounding the pipe, a pair of rotatable gears adapted to engage the gear rack on diametrically opposite sides thereof for imparting vertical movement to the sleeve, an elastic packing element carried by the sleeve and surrounding the pipe within the bore for packing off the annular space between said pipe and bore, means within the body for deforming the element into sealing position when the sleeve and element are moved to a predetermined position within the bore, and means for locking the elastic packing element and sleeve in any position within the bore of the body.

6. A packing device including, a tubular body, a cylindrical pipe extending axially through the body, a rotatable operating sleeve having an annular gear rack thereon and movable longitudinally within the bore of the body and surrounding the pipe, a pair of rotatable gears adapted to engage the gear rack on diametrically opposite sides thereof for imparting vertical movement to the sleeve, an elastic packing element carried by the sleeve and surrounding the pipe within the bore for packing off the annular space between said pipe and bore, means within the bore for deforming the element into sealing position when the sleeve and element are moved to a predetermined position within the bore, means for locking the packing element and sleeve in any position within the bore of the body, and means located exteriorly of the body for simultaneously rotating the gears to impart vertical movement to the sleeve and packing element.

LAURENCE L. RECTOR.

CERTIFICATE OF CORRECTION.

Patent No. 2,231,221.  February 11, 1941.

LAURENCE L. RECTOR.

It is hereby certified that error appears in the printed specification of the above numbered patent requiring correction as follows: Page 2, first column, lines 11 and 12, for the words "above the member 21 and an elastic distortable ring. An upper metallic member 22 is mounted" read --ring. An upper metallic member 22 is mounted above the member 21 and an elastic, distortable--; line 42, for "about" read --above--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.